United States Patent [19]

Hauck

[11] Patent Number: 5,768,544
[45] Date of Patent: Jun. 16, 1998

[54] DETERMINISTIC LATENCY CHARACTERIZATION AND MITIGATION

[75] Inventor: Jerrold V. Hauck, Fremont, Calif.

[73] Assignee: Intel Corporation, Santa Clara, Calif.

[21] Appl. No.: 721,269

[22] Filed: Sep. 26, 1996

[51] Int. Cl.⁶ ............................................. G06F 13/14
[52] U.S. Cl. .................... 395/298; 395/287; 395/297; 395/728; 395/856
[58] Field of Search .......................... 395/287, 297, 395/298, 728, 856; 364/240, 242.6, 242.92, 935.4, 935.41

[56] References Cited

U.S. PATENT DOCUMENTS

| | | | |
|---|---|---|---|
| 5,404,464 | 4/1995 | Bennett | 395/325 |
| 5,537,602 | 7/1996 | Kametani | 395/800 |
| 5,574,868 | 11/1996 | Marisetty | 395/298 |
| 5,625,778 | 4/1997 | Childers et al. | 395/287 |
| 5,664,197 | 9/1997 | Kardach et al. | 395/728 |
| 5,680,554 | 10/1997 | Baek | 395/287 |

OTHER PUBLICATIONS

Institute of Electrical and Electronics Engineers P1394.2 Standard, "Serial Express A Scalabe Gigabit Extension to Serial Bus", Apr. 8, 1996.

ISO/IEC 13213, ANSI/IEEE Standard 1212, "Information technology–Microprocessor systems–Control and Status Registers (CSR) Architecture for microcomputer buses", Oct. 5, 1995, first edition, pp. 41–45.

*Primary Examiner*—Jack B. Harvey
*Assistant Examiner*—Frantz Blanchard Jean
*Attorney, Agent, or Firm*—Blakely, Sokoloff, Taylor & Zafman

[57] ABSTRACT

A method is provided of requesting use of a shared resource in a computer system. The method is suited to applications in which the device requesting use of the resource can predict the need for the resource before the need actually arises. A request for use of the resource is characterized by a latency between the request and a subsequent granting of the request. The latency has both a deterministic component and a non-deterministic component. In response to an initialization of the computer system, the deterministic component of the latency is measured. The use of the resource is then requested by the requesting device some predetermined time before the time at which the need for such use arises. The predetermined time corresponds to the deterministic component of the latency. The amount of local buffering required within the device is therefore chosen to accommodate only the random latency component.

28 Claims, 7 Drawing Sheets

DETERMINISTIC LATENCY CHARACTERIZATION AND MITIGATION

FIELD OF THE INVENTION

The present invention pertains to the field of computer systems. More particularly, the present invention relates to the characterization and mitigation of latency associated with accessing resources in a computer system.

BACKGROUND OF THE INVENTION

One factor which can contribute to the cost of a computer system input/output (I/O) device is the amount of local buffering provided in the device. Buffering may be required as a result of delays which a device experiences when attempting to access a shared resource, or service, in a computer system, such as the host central processing unit (CPU), its memory subsystem, or an I/O interconnect. The time during which a device waits to receive access to a resource after requesting access is generally referred to as the "latency" of the resource. Latencies in a computer system often correspond directly to the amount of buffering required in an I/O device.

An I/O device might acquire data that will be transmitted to system memory. In that case, local buffering may be required in the I/O device to store the data until the device receives access to the bus. When determining the amount of local buffering required, some prior art designs assume service latencies ranging from zero to a specified maximum. Consequently, the total amount of local storage required for a function is approximately the function's bandwidth multiplied by the maximum specified latency. For example, a video capture subsystem may wait until the first pixel after a horizontal blanking period is received before requesting access to an I/O bus. The amount of buffering required in the video capture subsystem for incoming pixels is approximately the I/O bus access latency multiplied by the instantaneous pixel rate across a video line.

In terms of I/O device design, therefore, as the latencies experienced by a device increase, the required buffering in the device generally also increases. Hence, what is needed is a technique for reducing the amount of buffering required in an I/O device and, in particular, a technique for reducing the amount of buffering required in an I/O device as a result of latencies in a computer system.

SUMMARY OF THE INVENTION

A method of requesting access to a resource in a computer system is provided. A delay occurs between a request for the access and a subsequent granting of the access. The delay has a random component and a non-random component. After the non-random component of the delay is determined, it is determined when to request the access based on the non-random component.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method of requesting access to a resource in a computer system is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

Figure 1:
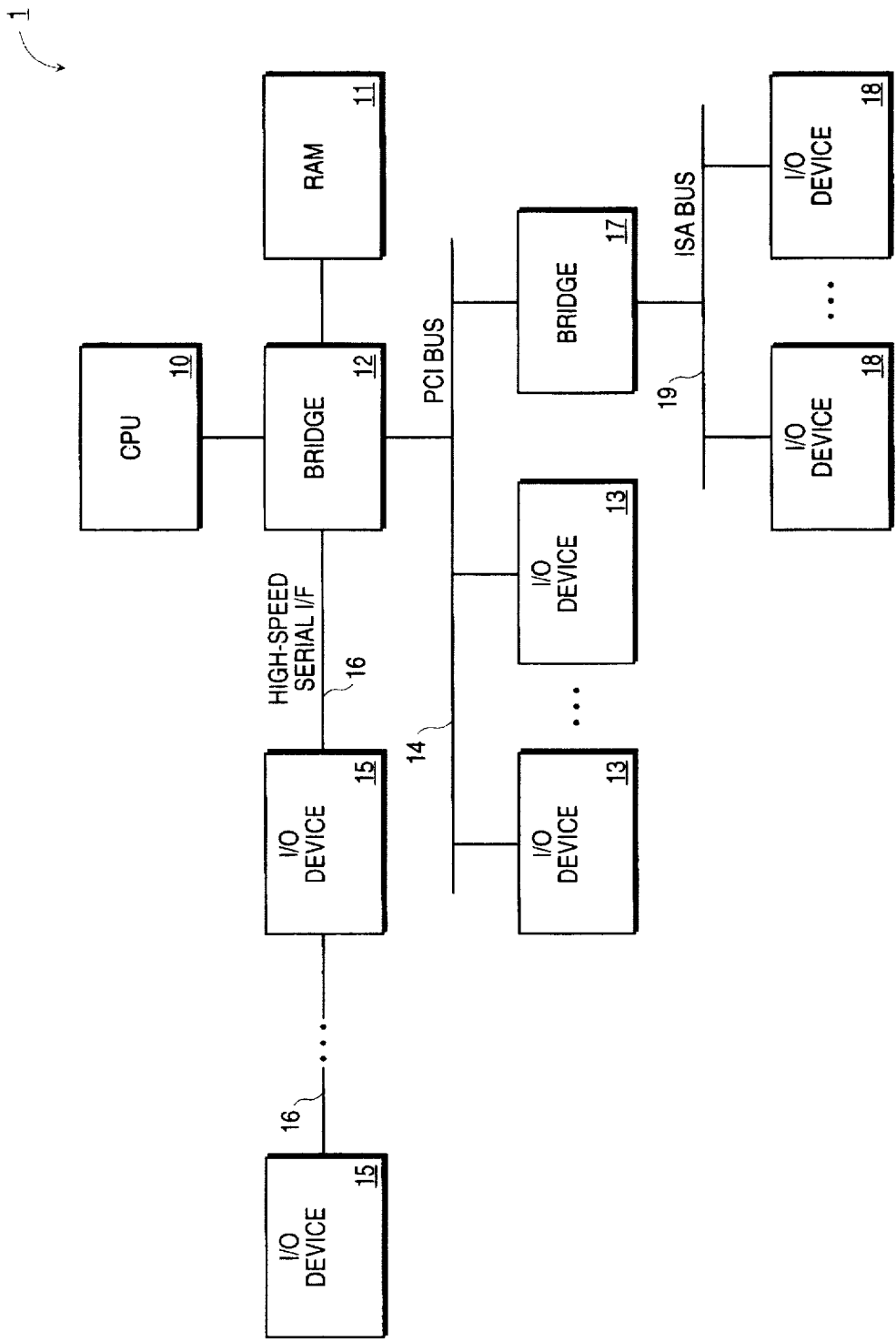
FIG. 1 illustrates a computer system in which the present invention is implemented.

FIG. 1 illustrates a computer system 1 in which the present invention is implemented. The computer system includes a central processing unit (CPU) 10, which is coupled to a random access memory (RAM) 11 by a bridge 12. RAM 11 serves as the system memory for the computer system 1. Also coupled to the bridge 12 is an input/output (I/O) bus 14. In one embodiment, the I/O bus 14 is a PCI (Peripheral Component Interconnect) bus. Various I/O devices 13 are coupled to the I/O bus 14. The I/O devices 13 may include any combination of various devices, such as a monitor, a printer, a cursor control device, a keyboard, a graphics adapter, a network interface or modem, etc. A second bridge 17 couples another I/O bus 19 to I/O bus 14. In one embodiment, I/O bus 19 is an ISA (Industry Standard Architecture) bus. A number of additional I/O devices 18 are coupled to I/O bus 19, which may also include any combination of various devices. Also coupled to bridge 12 is a high-speed serial interconnect 16, which couples a number of high-speed I/O devices 15 to bridge 12 in a daisy-chain logical configuration. In one embodiment, the high-speed serial interconnect 16 conforms to the IEEE (Institute of Electrical and Electronics Engineers) P1394.2 Standard, "Serial Express A Scalable Gigabit Extension to Serial Bus", Apr. 8, 1996 draft (hereinafter "P1394.2"), or its progeny.

Bridge 17 includes an arbiter to control access by I/O devices 18 to I/O bus 19. Similarly, bridge 12 includes an arbiter for controlling access by I/O devices 13 to bus 14. Bridge 12 also includes a memory controller for controlling access by all devices in the computer system 1 to RAM 11.

The present invention relates to the characterization and mitigation of latencies within a computer system, such as computer system 1, in order to reduce the amount of buffering required within I/O devices of the computer system. In one embodiment, the present invention includes steps which are performed by computer system 1 in response to CPU 10 executing sequences of instructions contained in RAM 11. Execution of the sequences of instructions contained in RAM 11 causes CPU 10 to characterize and mitigate latencies experienced by I/O devices 13, 15, and 18 of the computer system 1, as will be described hereafter.

The instructions may be loaded into RAM 11 from a persistent store, such as a magnetic or optical storage device, or from one or more other computer systems (collectively referred to as a "host computer system") over a network connection. For example, a host computer system may transmit a sequence of instructions to computer system 1 in response to a message transmitted to the host computer system over a network by computer system 1. As computer system 1 receives the instructions over the network connection, computer system 1 stores the instructions in RAM 11. Computer system 1 may store the instructions for later execution, or execute the instructions as they arrive over the network connection.

In some cases, the instructions may be directly supported by CPU 10. Consequently, execution of the instructions in that case may be performed directly by CPU 10. In other cases, the instructions may not be directly executable by CPU 10. Under these circumstances, the instructions may be executed by causing CPU 10 to execute an interpreter that interprets the instructions, or by causing CPU 10 to execute instructions which convert the received instructions to instructions that can be directly executed by processor 102.

In other embodiments, hardwired circuitry may be used in place of, or in combination with, software instructions to implement the present invention. Thus, the present invention is not limited to any specific combination of hardware circuitry and software, nor to any particular source for the instructions executed by computer system 1.

Figure 2:
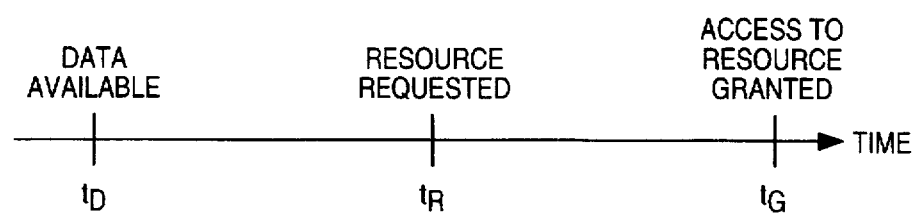
FIG. 2 illustrates timing relationships associated with an I/O device requesting access to a shared resource in a computer system of the prior art.

Some latency is normally associated with accessing shared resources in a computer system, such as the CPU, system memory, or an I/O bus. In many I/O devices used in a computer system, the amount of local buffering required within the device directly corresponds to the latencies experienced by the device when accessing a shared resource. Referring to FIG. 2, the overall latency experienced by an I/O device in accessing a resource is the time difference from the time $t_R$ at which the device requests access to the resource until the time $t_G$ at which the device is granted access to the resource. (Note that FIG. 2 is not drawn to scale.) Generally, in the prior art, the minimum amount of local storage required for a function is the function's bandwidth multiplied by the maximum specified latency. However, since an I/O device is typically not permitted to request access to the bus before data becomes available, the actual amount of buffering which is required in the I/O device must be sufficient to accommodate all data received from a time $t_D$ at which data first becomes available to the device until the time $t_G$ when access to the resource is granted. In most cases, however, the time difference between time $t_D$ and time $t_R$ will be negligible.

The latency associated with accessing a particular resource typically includes both a random component and a deterministic (i.e., non-random, or repeatable) component. The deterministic component of the latency can result from delays associated with traces, cabling, and wiring within the computer system and pipeline delays associated with various devices within the system, for example. In accordance with the present invention, both the deterministic and random components of each resource or service latency are considered. The present invention reduces the amount of buffering required in I/O devices by allowing the computer system 1 to determine at run-time the value of the deterministic component of the latency experienced by each I/O device with respect to each target resource of the device. By measuring the deterministic component of the latency for a particular resource or service in a particular system, an I/O device is permitted to request access to the resource or service before the need for such access actually arises, which reduces the amount of local buffering required within the device.

Hence, the present invention is most advantageous with respect to I/O devices that can predict the need to access a shared resource before the need actually arises. For example, in a video capture subsystem, the need to access an I/O bus may correspond directly to the horizontal blanking period, as discussed above. As another example, the "seek time" of a disk drive is the time required to move the read/write heads to a specific position relative to the disk and is generally a known parameter. When data is to be read from the disk, logic within the disk drive can effectively predict when that data will become available for transfer onto an I/O bus once the read operation is initiated, given the seek time. Numerous other types of I/O devices can similarly benefit from the present invention. Further, because the deterministic latency is quantified at run-time, the present invention is particularly advantageous in systems that are designed to be configured by the end user, such as P1394.2 compliant systems.

By quantifying the deterministic component of the latency experienced by an I/O device for a given resource or service in a particular system, the total latency is bounded with both a non-zero minimum and a maximum. The minimum latency value corresponds to the value of the deterministic component, while the difference between the minimum and the maximum values corresponds to the worst-case random component. Thus, for applications which can predict the need for access to a resource, the deterministic latency is effectively hidden by requesting the resource prior to the actual need for the resource.

Therefore, only the worst-case random component of the overall latency must be considered when determining buffer sizes. In particular, the ability to measure the deterministic component of the latency, which is discussed below, can be considered during the process of designing an I/O device in order to reduce the amount of local buffering provided in the device, relative to the prior art. Note that deterministic latencies caused by cabling and the like may constitute a substantial portion of the overall latency in many computer systems. For example, individual segments of a P1394.2 interconnect can be hundreds of meters in length, resulting in high deterministic latency. Thus, by "hiding" the deterministic latency by using an early request, as just described, the overall buffering requirement can be reduced substantially, even if the overall latency is high.

Figure 3:
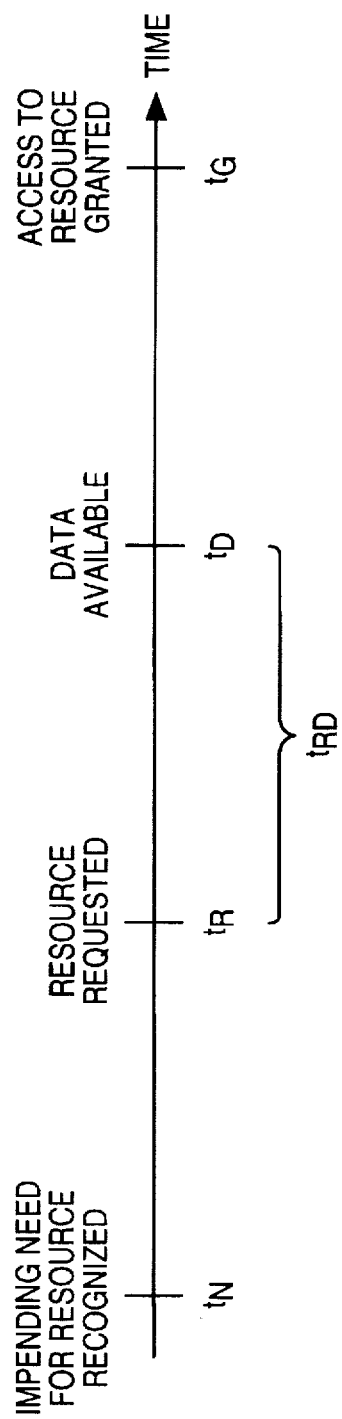
FIG. 3 illustrates timing relationships associated with an I/O device requesting access to a shared resource in accordance with the present invention.

Referring now to FIG. 3, a given I/O device in a given computer system recognizes the need to access a resource (e.g., a bus, the CPU, or memory) at a time $t_N$. (Note that FIG. 3 is not drawn to scale.) It is assumed that the given I/O device can predict the need for access to the resource in advance. By "knowing" the value of the deterministic component of the latency for that resource in that particular system, the I/O device is able to request access to the resource at time $t_R$, before the time $t_D$ at which the need for the resource arises, (i.e., the time $t_D$ at which data becomes available to the I/O device). That is, the difference between times $t_R$ and $t_D$ is set equal to (or slightly less than, if desired) the deterministic component of the latency experienced by that device when accessing that resource. Hence, according to the present invention, an access request is made earlier in time relative to the prior art, by an amount that is based on the deterministic component of the latency. Consequently, the amount of local buffering required in the I/O device is reduced relative to the prior art, because the device will need to store data locally for a shorter length of time before receiving access to the resource than in the prior art.

Referring again to the example of the video capture subsystem, the video capture device can predict when the first pixel will arrive relative to the horizontal blanking signals. Consequently, the video capture device requests access to the bus in advance, and the first pixel is guaranteed to be acquired by the video capture device coincidental with or prior to access to the bus being granted to the device. Hence, the amount of local buffering provided in the video capture subsystem can be reduced.

The deterministic component of the latencies can be determined either statically or dynamically at run-time for a particular configured computer system. In a cabled computer system, for example, one method of exacting precise deterministic latency values at run-time is to measure the round-trip time of a special signal or packet applied on the outbound portion of a cable and received on the inbound portion of the cable. For cables such as interconnect 16 in FIG. 1, this technique will actually yield the deterministic latency caused by both the cable lengths and the pipeline stages in the transceivers of the devices 15 on the cable. Because the pipeline delays are also deterministic, however, their addition to the measurement is welcome. Note that this method of measuring deterministic latency requires symmetry between the outbound and inbound paths. Note further that, when determining the value of the deterministic latency, any random latency components that might exist at that time must be factored out, or the measurement must be performed when no random latency is present.

Figure 4:
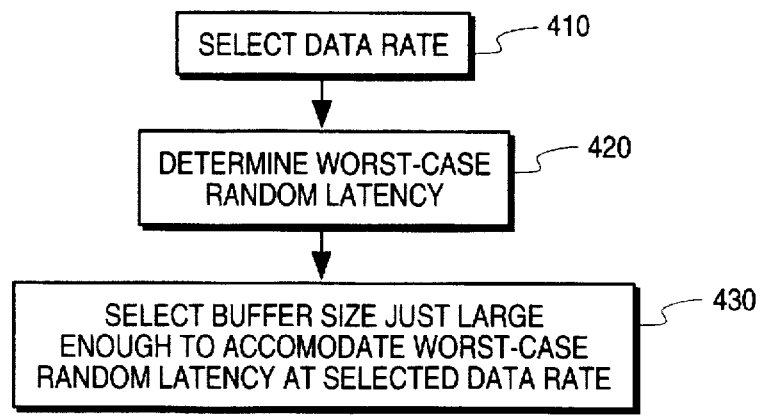
FIG. 4 is a flow diagram illustrating steps in designing a buffer for an I/O device.

Thus, by measuring the deterministic latency in the manner described above, the design process can be modified in order to yield a smaller local buffering requirement for a given I/O device, as illustrated by FIG. 4. Once the data rate for the I/O device is known (step 410), and the worst case random latency experienced by the device is determined (step 420), the buffer size is then selected for the device to be just sufficient to accommodate only the worst case random latency (i.e., exclusive of the deterministic latency) at the selected data rate (step 430). The worst case random latency generally can be obtained from an applicable specification or standard, such as the bus specification in the case where the shared resource is an I/O bus.

Figure 5:
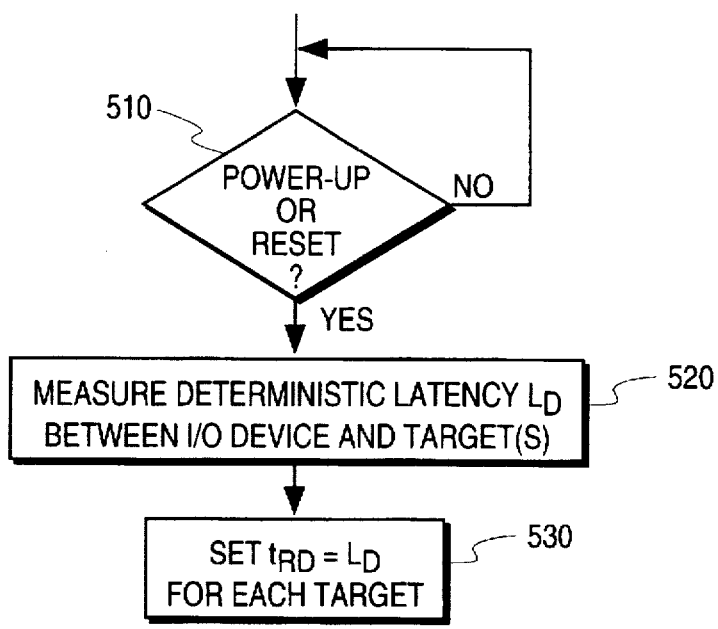
FIG. 5 is a flow diagram illustrating an overall routine for characterizing and mitigating latency in a computer system.

FIG. 5 illustrates an overall routine for configuring an I/O device to accommodate reduced local buffering, according to one embodiment. As mentioned above, the deterministic latency may be determined either statically or dynamically at run-time. In the embodiment of FIG. 5, the routine is performed as part of an initialization process of the computer system 1. Hence, in one embodiment, which is illustrated by FIG. 5, the deterministic latency $L_D$ between a given I/O device and the target of that device is measured in response to a power-up or reset of the computer system (steps 510 and 520). Associated with each I/O device is an advance time $t_{RD}$ which is defined as the time interval $t_D-t_R$ (see FIG. 3), i.e., the amount of time prior to the time $t_D$ when data becomes available at which the device requests access to a resource. After measuring the deterministic latency $L_D$ applicable to each target resource of an I/O device, the time $t_{RD}$ of the I/O device is set equal to the deterministic latency $L_D$ for each target. Note that the value of deterministic latency $L_D$, and therefore the time $t_{RD}$, may be different for each target resource of an I/O device. Note that the time $t_{RD}$ can be set less than $L_D$, in which case access to the resource will not be granted until sometime after data is acquired by the I/O device; in that case, some additional buffer space will be required compared to the case where $t_{RD}$ is set equal to $L_D$. The time $t_{RD}$ should not be set greater than $L_D$, since doing so might result in access being granted before data is available; such a result is not desirable and is prohibited in many architectures.

Figure 6:
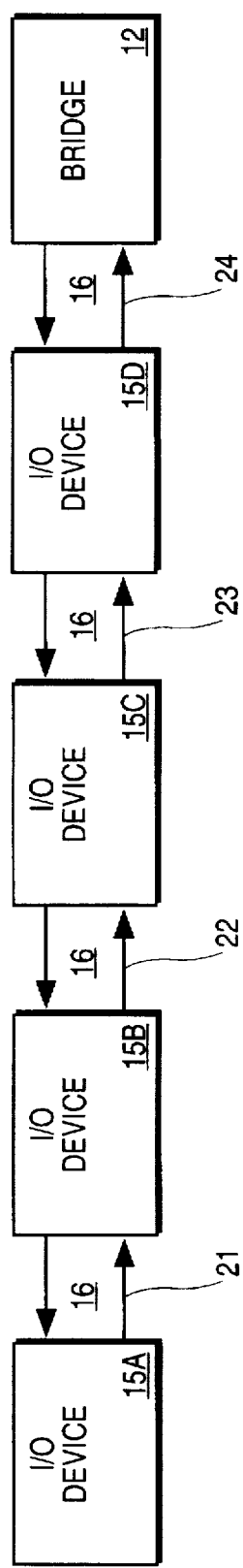
FIG. 6 illustrates a number of I/O devices connected on a high-speed serial link.
Figure 7:
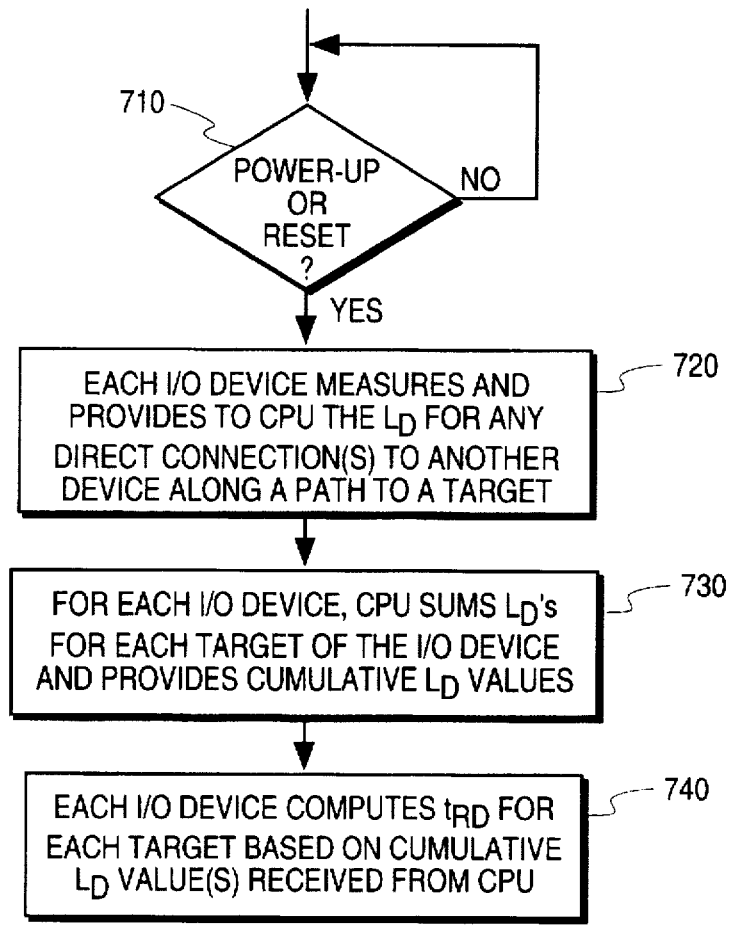
FIG. 7 is a flow diagram illustrating a routine for computing an advance access request time for requesting access to a shared resource in a computer system.

Refer now to FIGS. 6 and 7. FIG. 6 shows interconnect 16 of FIG. 1 in one embodiment in which interconnect 16 conforms to the P1394.2 standard. In this embodiment, the logical configuration of I/O devices 15A–15D is a daisy chain. Note, however, that a daisy-chain configuration is not required in order to practice the present invention. The physical connections between I/O devices 15A–15D are actually point-to-point. Each of I/O devices 15B–15D has four point-to-point connections—two input connections, one from each of two of the other devices, and two output connections, one to each of those two other devices. I/O device 15A has a single input connection and a single output connection, both to I/O device 15B.

FIG. 7 shows a more detailed version of the routine of FIG. 5 that is applicable to the configuration of FIG. 6, according to one embodiment. In response to a system power-up or reset (step 710), each of the I/O devices 15 measures and then provides to the CPU 10 the value of the deterministic latency $L_D$ for any direct connection it has to another device along a path to a target resource, i.e., for one cable segment (step 720). The latency values measured by each I/O device are stored in registers within the I/O device.

Assume, for example, that the target resource being considered is system memory (i.e., RAM 11). Access to RAM 11 by any of devices 15A–15D will be controlled by a memory controller within bridge 12. In a P1394.2 connection, the cable lengths per segment can be hundreds of meters in length. Therefore, it is assumed that the trace length between bridge 12 and RAM 11 is very short compared to the lengths of connections 21–24. The deterministic latency experienced by I/O device 15A when accessing RAM 11 is therefore approximately equal to the sum of the individual deterministic latencies along the path from I/O device 15A to bridge 12, i.e., the individual deterministic latencies for connections 21, 22, 23, and 24, and the associated pipeline stages within I/O devices 15B, 15C, and 15D.

Therefore, (in step 720) I/O device 15A would measure the deterministic latency associated with connection 21 and any pipeline stages in either device 15A or 15B that are encountered by a packet making a round trip between device 15A and 15B. Similarly, device 15B would measure the deterministic latency associated with connection 22 and any pipeline stages in either device 15B or 15C that are encountered by a packet making a round trip between device 15B and 15C. Device 15C would measure the deterministic latency associated with connection 23 and any pipeline stages in either device 15C or 15D that are encountered by a packet making a round trip between device 15C and 15D. Device 15D would measure the deterministic latency associated with connection 24 and any pipeline stages in either device 15D or bridge 12 that are encountered by a packet making a round trip between device 15D and bridge 12.

Each of the deterministic latency values measured for individual point-to-point connections by devices 15A–15D is then provided to CPU 10 (step 720) for each possible target resource. Then, for each of the I/O devices 15A–15D, the CPU 10 sums the values of $L_D$ for each target resource and provides the sum $L_D$ value to the I/O device (step 730). The cumulative latency values $L_D$ are stored in registers within the I/O devices and CPU 10. Thus, each I/O device receives a cumulative latency value $L_D$ for each potential target resource of that device. Each device then computes its advance request time $t_{RD}$ for that target resource based on the cumulative deterministic latency value $L_D$ received from the CPU 10 with respect to each target.

Note that in various embodiments of the present invention, the required measurements and computations (e.g., measuring the deterministic latencies $L_D$, computing the time $t_{RD}$, etc.) may be performed either in CPU 10 or in an I/O device, or any combination thereof. Moreover, these routines may be implemented by any combination of hardware, software, or both, as already noted.

Thus, a method of requesting access to a resource in a computer system has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of requesting access to a resource in a computer system, the access being characterized by a delay between a request for the access and a granting of the access, the delay having a random component and a non-random component, the method comprising:

determining the non-random component of the delay; and determining when to request the access based on the non-random component of the delay.

2. A method according to claim 1, further comprising the step of predicting a time at which the access will be required.

3. A method according to claim 2, further comprising the step of requesting the access a predetermined time prior to the time predicted in the predicting step, wherein the predetermined time is based on the non-random component of the delay.

4. A method according to claim 3, wherein the predetermined time is equal to the non-random component of the delay.

5. A method according to claim 1, wherein the step of determining the non-random component of the delay comprises the step of determining the non-random component of the delay as part of an initialization process of the computer system.

6. A method according to claim 1, wherein the resource comprises a bus.

7. A method according to claim 6, wherein the step of determining the non-random component of the delay comprises the steps of:

transmitting a message onto the bus;

receiving a response to the message; and determining the non-random component of the delay based on an elapsed time between the transmitting step and the receiving step.

8. A method of requesting use of a resource in a computer system, the method being characterized by a delay between a request for use of the resource and a granting of use of the resource, the delay having a deterministic component and a non-deterministic component, the method comprising:

determining the deterministic component of the delay;

predicting a time at which use of the resource will be needed; and requesting use of the resource a predetermined time before the predicted time, wherein the predetermined time is based on the deterministic component of the delay.

9. A method according to claim 8, wherein the predetermined time is equal to the deterministic component of the delay.

10. A method according to claim 8, wherein the step of determining the deterministic component of the delay comprises the step of determining the deterministic component of the delay as part of an initialization process of the computer system.

11. A method according to claim 8, wherein the resource comprises a bus.

12. A method according to claim 8, wherein the step of determining the deterministic component of the delay comprises the steps of:

causing a first message to be transmitted;

causing a second message to be received, and causing the deterministic component of the delay to be determined based on a delay between the first message and the second message.

13. In a computer system including a bus and a plurality of devices coupled to the bus, a method of requesting use of the bus, the method being characterized by a delay between a request for use of the bus and a granting of use of the bus, the delay having a deterministic component and a non-deterministic component, the method comprising:

in response to an initialization of the computer system, determining the deterministic component of the delay based on an elapsed time between the transmitting step and the receiving step;

predicting a time at which use of the bus will be required; and requesting use of the bus a predetermined time prior to the time predicted in the predicting step, wherein the predetermined time is based on the deterministic component of the delay.

14. A method according to claim 13, wherein the predetermined time is equal to the deterministic component of the delay.

15. A method according to claim 13, wherein the step of determining the deterministic component of the delay comprises the steps of:

causing a message to be transmitted onto the bus;

causing a response to the message to be received;

causing the deterministic component of the delay to be determined based on the response to the message.

16. An apparatus for use in a computer system, the apparatus capable of requesting use of a resource in the computer system, wherein the use of the resource is characterized by a delay between a requesting of the resource and a granting of the resource, the apparatus comprising:

a processor; and a memory, the memory having instructions stored therein which, when executed by the processor, cause the processor to:

determine a non-random component of the delay; and determine when to request the access based on the non-random component of the delay.

17. An apparatus according to claim 16, wherein the instructions further comprise instructions which, when executed by the processor, cause the processor to predict a time at which use of the resource will be required.

18. An apparatus according to claim 17, wherein the instructions further comprise instructions which, when executed by the processor, cause the processor to request use of the resource a predetermined time prior to the time predicted in the predicting step, wherein the predetermined time is based on the non-random component of the delay.

19. An apparatus according to claim 18, wherein the predetermined time is equal to the non-random component of the delay.

20. An apparatus according to claim 16, wherein the instructions which cause the processor to determine the non-random component of the delay comprise instructions which, when executed by the processor, cause the processor to determine the non-random component of the delay during an initialization process of the computer system.

21. An apparatus according to claim 16, wherein the resource comprises a bus.

22. An apparatus according to claim 21, wherein the apparatus comprises an input/output device for use in the computer system.

23. An apparatus according to claim 16, wherein the instructions which cause the processor to determine the non-random component of the delay comprise instructions which, when executed by the processor, cause the processor to:

transmit a first message onto a bus;

receive a second message transmitted onto the bus, and determine the non-random component of the delay based on a delay between the first message and the second message.

24. An apparatus for requesting access to a resource in a computer system, the access being characterized by a delay between a request for the access and a granting of the access, the delay having a random component and a non-random component, the apparatus comprising:

means for determining the non-random component of the delay;

means for predicting a time at which use of the resource will be needed; and means for requesting use of the resource a predetermined time before the predicted time, wherein the predetermined time is based on the non-random component of the delay.

25. An apparatus according to claim 24, wherein the predetermined time is equal to the non-random component of the delay.

26. An apparatus according to claim 24, wherein the means for determining the non-random component of the delay comprises means for determining the non-random component of the delay as part of an initialization process of the computer system.

27. An apparatus according to claim 24, wherein the resource comprises a bus.

28. An apparatus according to claim 24, wherein the computer system includes a bus, and wherein the means for predicting comprises:

means for transmitting a message onto the bus;

means for receiving a response to the message; and means for determining the non-random component of the delay based on an elapsed time between the transmitting step and the receiving step.

* * * * *